United States Patent
Fasen (12)

(10) Patent No.: US 6,169,640 B1
(45) Date of Patent: Jan. 2, 2001

(54) SERVO BAND IDENTIFICATION IN LINEAR TAPE SYSTEMS HAVING TIMING BASED SERVO FORMATS

(75) Inventor: Donald J. Fasen, Boise, ID (US)

(73) Assignee: Hewlett-Packard Co., Palo Alto, CA (US)

(*) Notice: Under 35 U.S.C. 154(b), the term of this patent shall be extended for 0 days.

(21) Appl. No.: 09/034,972

(22) Filed: Mar. 4, 1998

(51) Int. Cl.[7] .................................................. G11B 5/09
(52) U.S. Cl. ..................... 360/48; 360/77.12; 360/78.02; 360/121
(58) Field of Search ............................... 360/77.12, 78.02, 360/48, 77.13, 53, 121, 122, 72.1, 72.2, 75

(56) References Cited

U.S. PATENT DOCUMENTS 5,523,904 * 6/1996 Saliba ................................. 360/77.12

* cited by examiner

Primary Examiner—Andrew L. Sniezek

(57) ABSTRACT

Disclosed herein is a method of formatting timing based servo bands, as used in linear data tape systems, in a way that allows differentiation between different adjacent pairs of servo bands. Each servo band is recorded with a similar or identical timing based pattern. However, the patterns in the various servo bands are offset longitudinally from each other, so that each pair of adjacent servo bands exhibits a unique inter-band timing relationship. The bands are recorded using a patterned write head with write gaps at different longitudinal offsets.

15 Claims, 7 Drawing Sheets

SERVO BAND IDENTIFICATION IN LINEAR TAPE SYSTEMS HAVING TIMING BASED SERVO FORMATS

FIELD OF THE INVENTION

This invention relates to linear tape systems and to methods of formatting and identifying servo bands or bands in linear tape systems having timing based servos.

BACKGROUND OF THE INVENTION

Because of its relatively low cost, linear tape is commonly used as a medium for storing large amounts of digital data for archival purposes. For example, disk-based memory is often archived on linear data storage tape.

Data is formatted on linear tapes in a plurality of tracks that extend longitudinally along the tape. A tape head is moveable laterally across the tape to read or write different tracks. In many cases, multiple tracks can be written or read at the same time by using a tape head with multiple read/write elements.

When reading or writing a linear data storage tape, accurate lateral positioning of the tape head is very important. To achieve such accuracy, servo bands are prewritten to the tape. The servo bands are detected by the tape head during reading and writing to determine the exact lateral position of the tape head relative to the linear tape.

FIG. 1 illustrates, conceptually, the use of servo bands. FIG. 1 shows a segment of a linear tape 10 that extends in a longitudinal direction x, and that has a lateral dimension y. The tape includes a plurality of servo bands 12. In the simplified example of FIG. 1 there are three servo bands. The servo bands are written to the tape during a preparatory "formatting" process, prior to actual use of the tape for data storage. The servo bands are spaced laterally from each other by a specified distance.

Data tracks 14 are located between the servo bands. The lateral positions of the data tracks are specified relative to the servo bands.

When reading or writing tape 10, a tape head senses the servo bands with servo read elements and positions itself precisely relative to the servo bands. Within the tape head, data read/write elements are spaced relative to the servo read elements so that the data read/write elements will be positioned over data tracks 14 when the servo read elements are positioned accurately over the corresponding servo bands.

In an actual embodiment, a linear tape might have more than three servo bands. Many tape heads are configured to span two adjacent servo bands at any given time and to read or write only the data tracks between those servo bands. To read or write other data tracks, such a tape head is repositioned to span two different servo bands.

There are different ways to derive lateral position information from a servo band. One common way is to divide a servo band into two half bands, which are recorded with different information (such as two distinct frequencies or bursts occurring at distinct times). A single servo head straddles the boundary between the half bands, and position information is obtained by comparing the amplitude or phase responses of the signals generated from the respective half bands.

A different approach has been described in Albrecht, et al., *Time-Based, Track-Following Servos for Linear Tape Drives,* Data Storage Magazine, 1997 (p. 41), which is hereby incorporated by reference. This approach uses a timing-based servo in which a narrow servo head reads a continuously variable servo band.

FIG. 2 shows an example of a continuously-variable, timing-based servo pattern, along with a signal generated by a servo read element positioned over the servo pattern. The pattern consists of alternating magnetic transitions at two different azimuthal slopes. Relative timing of pulses generated by the read element depends on the lateral position of the head.

More specifically, the servo band illustrated in FIG. 2 has a series of magnetic transitions 20 and 22 referred to as "stripes" 20 and 22 that are recorded on the tape with alternate azimuthal slopes. Every other stripe 20 has a positive slope, while the intervening stripes 22 have negative slopes.

FIG. 2 shows the path and width of the servo head, indicated by reference numeral 24. The servo head reads a lateral width that is significantly less than the full lateral width of the stripes themselves. The signal generated by the servo head is represented by trace 26, illustrated directly below the illustrated magnetic transition stripes. When the servo head encounters a stripe, it generates a positive pulse. When the servo head leaves the stripe, it generates a negative pulse.

Lateral position information can be derived by comparing the distances between pulses. For example, a first distance A can be defined as the distance from a positive stripe to the next negative stripe, while a second distance B can be defined as the distance from a negative stripe to the next positive stripe. When the servo head is centered over the servo band, A will be equal to B: consecutive pulses will occur at equal intervals.

In actual implementation, alternating "bursts" of stripes are used, with a burst being defined as one or more individual magnetic transition stripes.

FIG. 3 shows an example of a servo band layout utilizing alternating bursts of magnetic transition stripes. Each burst has an opposite azimuthal slope from the previous burst. The servo pattern includes repeating frames. Each frame has a first subframe A and a second subframe B. Each subframe has a pair of bursts, with the bursts of each frame having different azimuthal slopes. Subframe A has a first burst 38 with five equally-spaced stripes having a positive azimuthal slope. Subframe A has a second burst 40 with five equally-spaced stripes having negative azimuthal slopes. Subframe B has similar bursts 42 and 44, except each of these bursts has four stripes.

It is preferable to record servo bands on a tape prior to its actual use for storing data. In order to ensure precise spacing of servo bands such as shown in FIGS. 2 and 3, it is desirable to use a patterned write head, configured to simultaneously write corresponding stripes of multiple servo bands.

FIG. 4 shows an example of patterned servo write head for writing multiple servo bands on a single linear tape. The head's write pattern is illustrated relative to an underlying linear tape 46 that has four servo bands 48. At lateral positions corresponding to each servo band, the write head pattern includes pairs of write elements or gaps. One element 50 of each pair is configured to produce a magnetic transition stripe having a positive slope. Another element 52 of each pair is configured to produce a magnetic transition stripe having a negative slope. Using this configuration, a single current pulse to the head writes stripes simultaneously to all of the servo bands. Such pulses are repeated to produce stripes in the desired pattern, with the desired spacing.

While this method of establishing servo bands is efficient and accurate, it requires that each servo band be encoded with an identical pattern. This makes it impossible to distinguish one servo band from another.

However, differentiation between servo bands is very important when writing and reading linear data tapes; the consequences of incorrectly identifying a given servo band are significant. Although servo bands such as described above provide a high degree of relative positioning accuracy once a particular servo band has been identified, the mechanics of a tape drive generally do not provide enough absolute tape/head positioning accuracy to identify a sensed servo band and to differentiate it from other servo bands.

The invention described herein provides a way to uniquely identify and distinguish between servo bands. This is accomplished while still maintaining the benefits of a patterned servo write head, in which a plurality of magnetic transitions are written with a single pulse to the write head.

SUMMARY OF THE INVENTION

In accordance with the invention, each timing based servo band has an identical pattern of magnetic transitions, which can be conveniently written with a patterned servo write head. However, the head is patterned so that the timing patterns of different servo bands will be offset from each other longitudinally along the linear tape. More specifically, each adjacent pair of servo bands will exhibit a different timing relationship relative to other pairs of servo bands, thereby allowing each pair to be uniquely identified and differentiated from other servo bands.

DETAILED DESCRIPTION OF THE INVENTION

Figure 5:
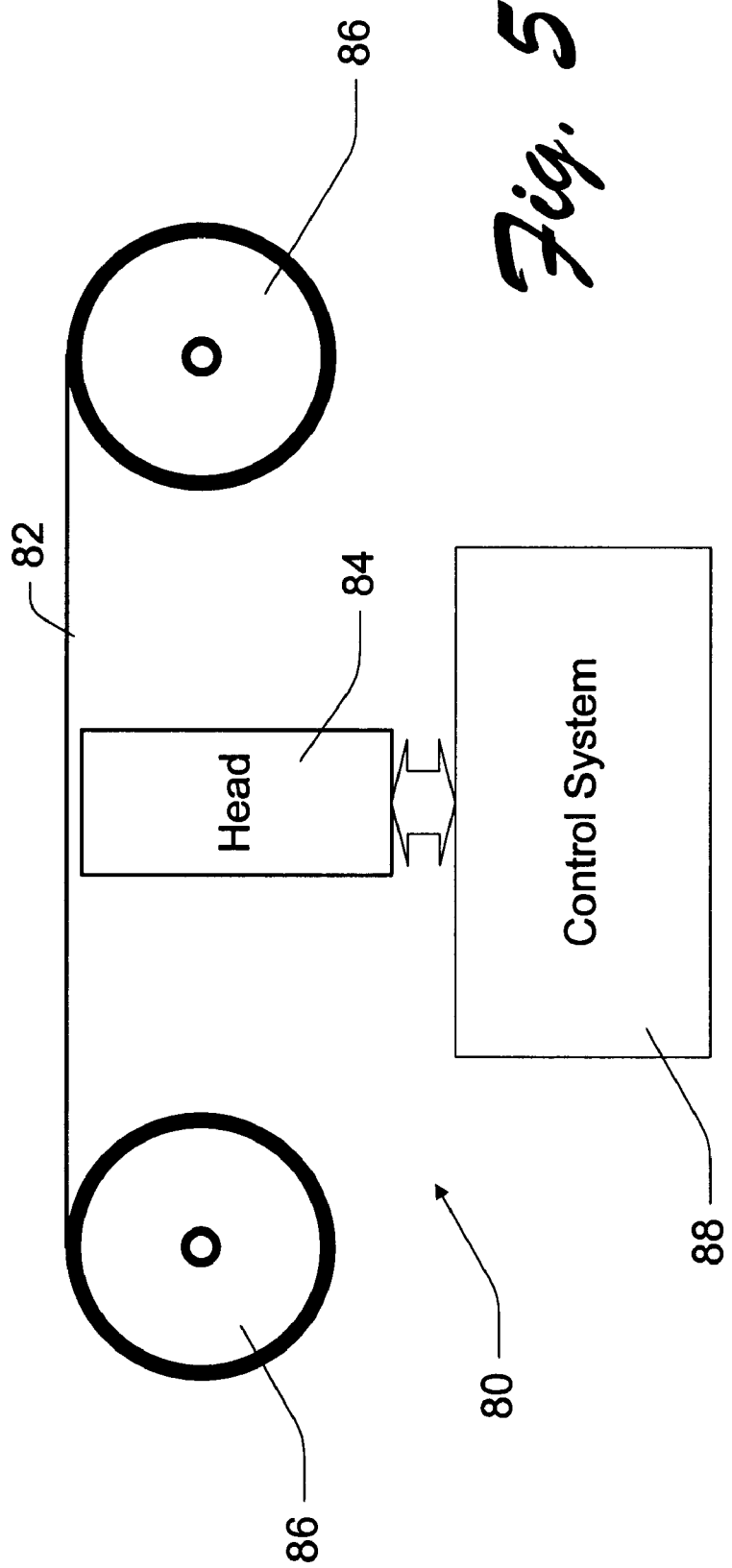
FIG. 5 is a simplified block diagram of a linear tape storage system 80 in accordance with the invention.

FIG. 5 shows elements of a linear storage tape system 80 in accordance with the invention. System 80 includes a linear storage tape 82, a tape read/write head 84, a drive system 86 that transports the tape past the tape head, and control electronics 88.

Figure 6:
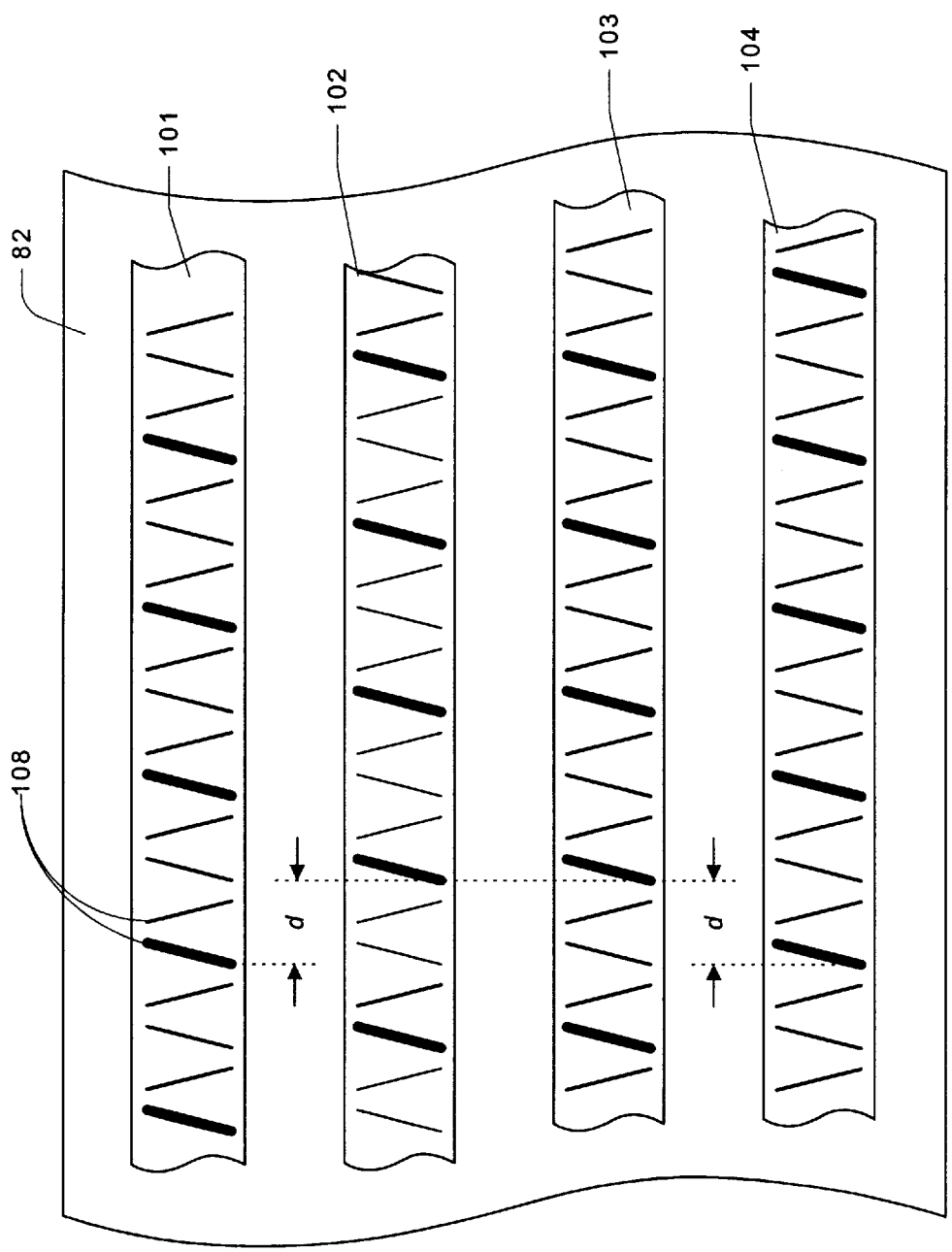
FIG. 6 shows a segment of a linear tape in accordance with the invention, illustrating its timing based servo pattern.

FIG. 6 shows a segment of a linear data storage tape 82. A plurality of servo bands extend longitudinally along tape 82. In this example, the tape has four servo bands, labeled 101, 102, 103, and 104. A plurality of data tracks (not shown) are positioned between respective pairs of servo bands. Note that FIG. 6 is drawn for purposes of conceptual illustration, and does not therefore indicate relative sizes of the various illustrated tape features.

In the described embodiment, data storage tape 82 is designed for use with a tape head having a pair of servo read elements and a plurality of intervening data read/write elements. Accordingly, the servo bands are spaced laterally across the tape from each other, with intervening data tracks or bundles. In use, read/write head 84 (FIG. 5) is positioned over an adjacent pair of servo bands while data is read or written between those servo bands using data read/write elements of the tape head. Thus, each set or bundle of data tracks is associated with a surrounding pair of servo bands. The invention allows each such pair of servo bands to be differentiated from other pairs of servo bands.

Figure 1:
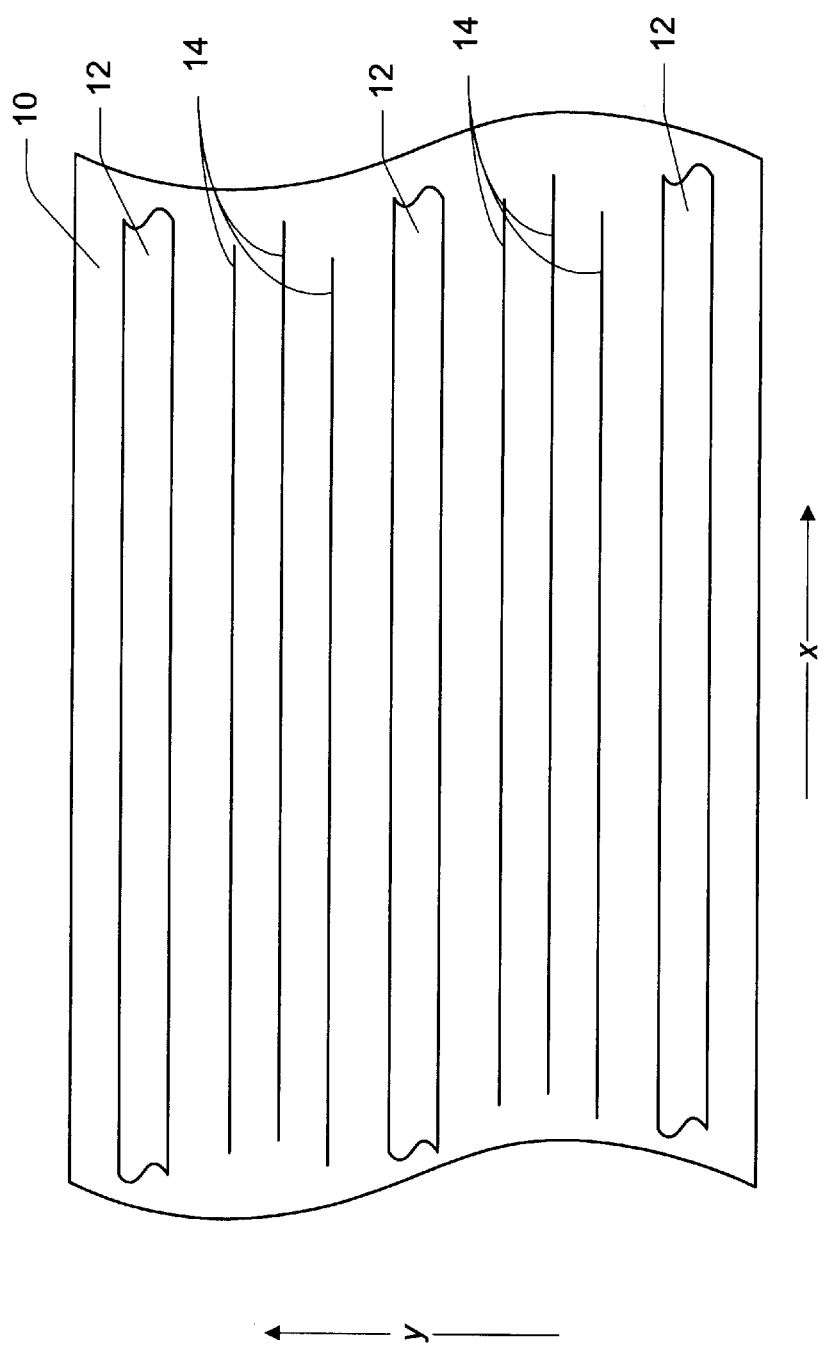
FIG. 1 shows a segment of a prior art linear tape and illustrates the layout of servo bands and data tracks on the linear tape.
Figure 2:
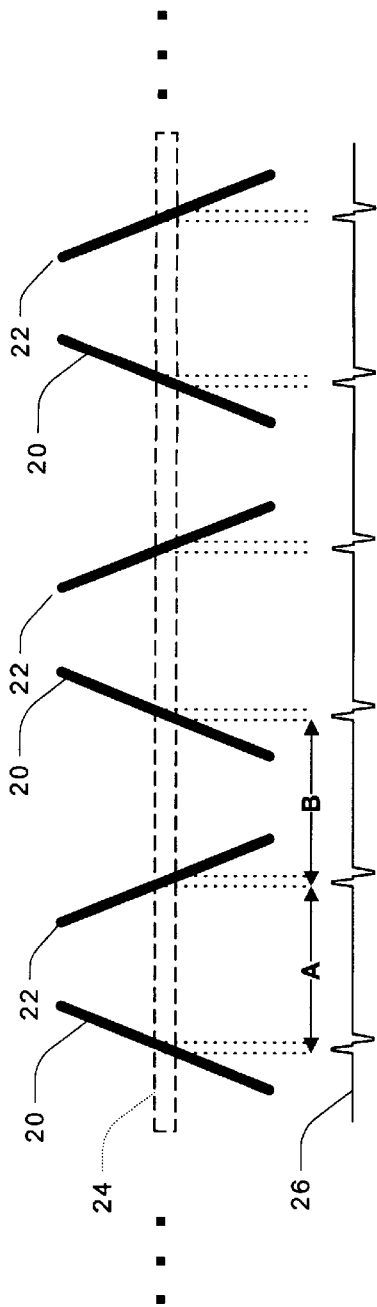
FIG. 2 illustrates a timing pattern such as might be utilized on the servo bands of the linear tape shown in FIG. 1, along with a trace of a read signal resulting from such a timing pattern.
Figure 3:
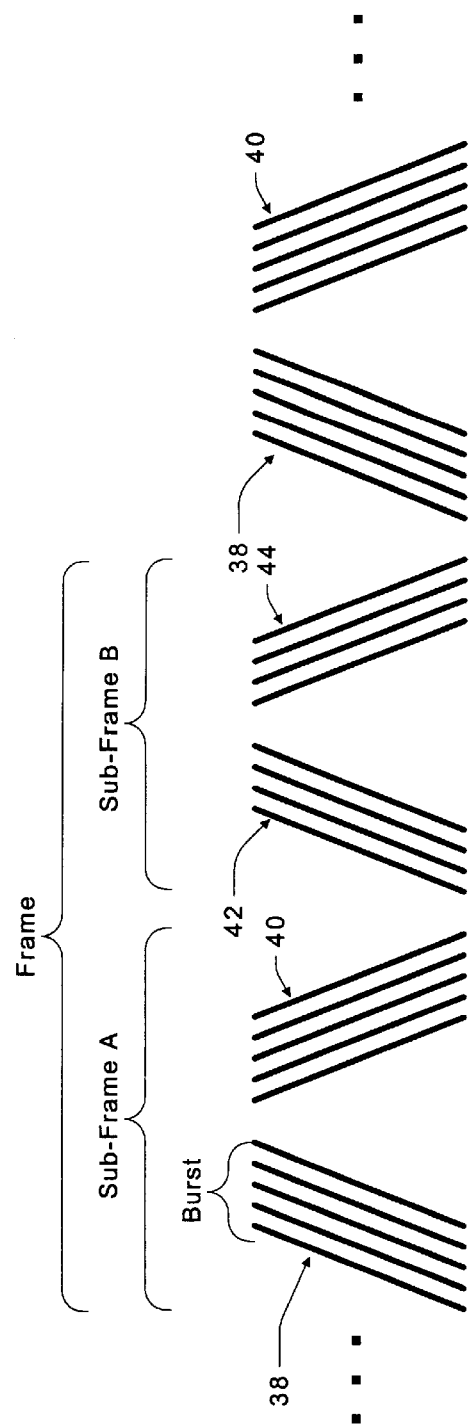
FIG. 3 illustrates a timing pattern similar to that of FIG. 2, using bursts of magnetic transitions or stripes.
Figure 4:
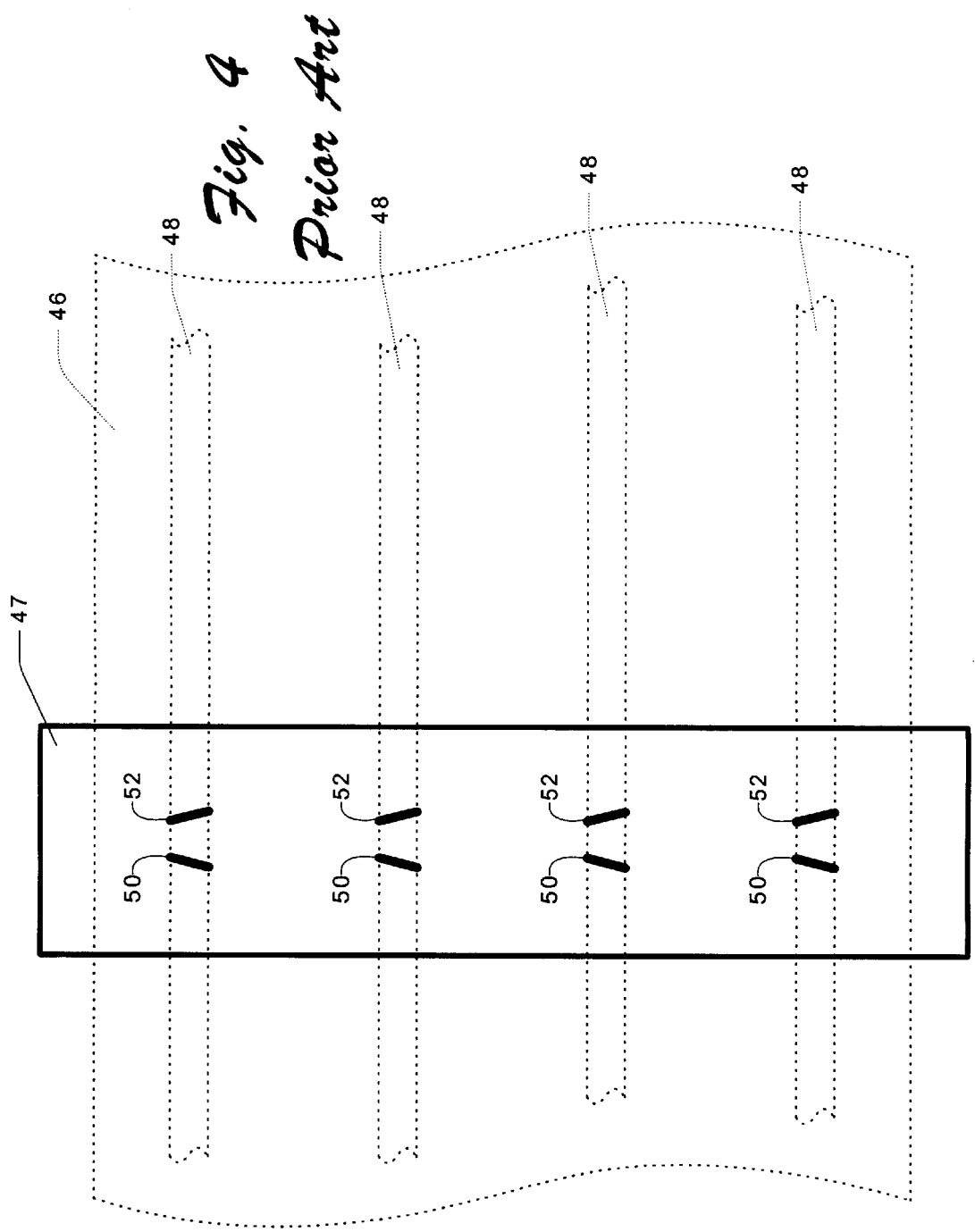
FIG. 4 is a diagrammatic view illustrating a prior art write element pattern in a servo write head, relative to an underlying linear tape.

All the servo bands have similar or identical longitudinal patterns of magnetic transitions or stripes. Each pattern is similar to the pattern shown in FIG. 4 above, comprising alternating bursts 108 of non-zero-azimuth magnetic transitions. Every other burst has transitions with positive slopes, and the intervening bursts have transitions with negative slopes. For purposes of illustration, each burst is shown in FIG. 6 as a single line. The lines are sloped to indicate slopes of the transitions within the corresponding bursts. The bursts are arranged in pairs of positive and negative slopes. A frame consists of two adjacent pairs. In FIG. 6, the leading burst of a frame is indicated by a relatively wider line than the remaining bursts of a frame.

In accordance with the invention, the patterns of the respective servo bands are offset longitudinally relative to each other. More specifically, there is a different longitudinal offset between the two servo bands of each respective adjacent pair of servo bands.

In the example shown, servo bands 102 and 103 are offset by half of a frame from servo bands 101 and 104. More specifically, bands 102 and 103 are positioned longitudinally so that they begin a distance d after the start of corresponding frames in bands 101 and 104 (assuming right-to-left tape movement), where d is equal to half of the length of an entire frame.

Because of the longitudinal offsetting of the servo band stripe patterns, any pair of servo bands can be uniquely identified by the timing relationship of the respective stripe frames of the two servo bands. In the described example, there are three possible positions of a tape read/write head: over servo bands 101 and 102; over servo bands 102 and 103; and over servo bands 103 and 104. In each position, there will be a unique timing relationship between the two servo signals generated by the read/write head. In the first position, with the servo read elements of the tape head over servo bands 101 and 102, the signal generated by the first servo read element (positioned over servo band 101) will lead the signal generated by the second read element (positioned over servo band 102). In the second position, with the servo read elements of the tape head over servo bands 102 and 103, the signal generated by the first servo read element (positioned over servo band 102) will coincide with the signal generated by the second read element (positioned over servo band 103). In the third position, with the servo read elements of the tape head over servo bands 103 and 104, the signal generated by the first servo read element (positioned over servo band 103) will lag the signal generated by the second read element (positioned over servo band 104). Thus, a time-based comparison of any two adjacent servo band patterns differentiates any pair of servo bands from any other pair of servo bands. This allows unambiguous identification of data tracks or bundles when reading and writing data in lateral data track positions relative to the servo bands.

Figure 7:
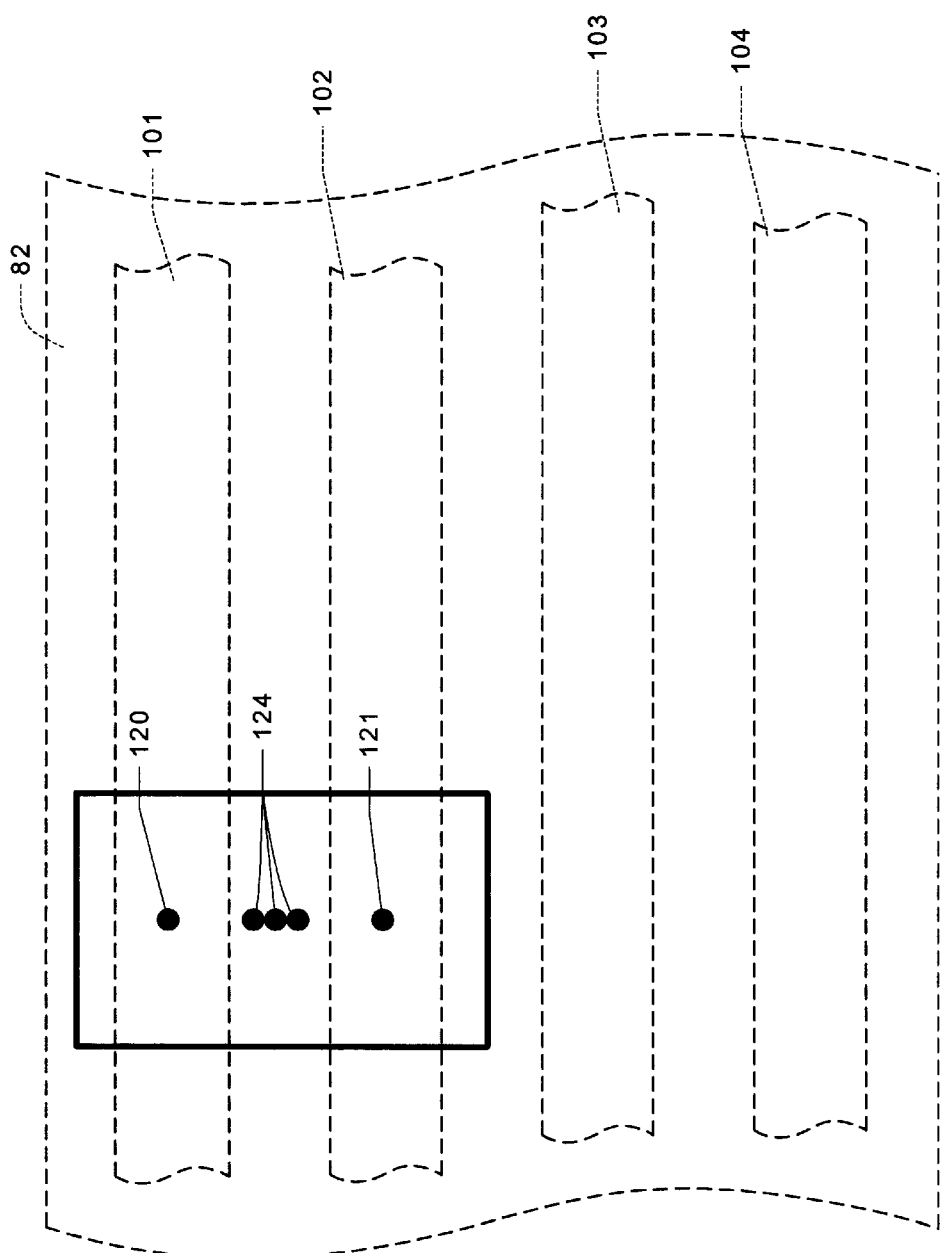
FIG. 7 illustrates the layout of elements of a tape head in accordance with the invention, relative to an underlying segment of a linear tape that is formatted in accordance with the invention.

FIG. 7 shows a pattern of servo read elements and data read/write elements as they are preferably configured in tape head 84. The pattern includes a pair of servo read elements 120 and 121, spaced laterally at same distance as any two servo bands on tape 82. The servo read elements are narrow in comparison to the servo band stripes. In the described embodiment, the servo read elements are approximately 2.9% of the width of a servo band stripe. Between the servo read elements are a plurality of conventional data read/write elements 124.

Figure 8:
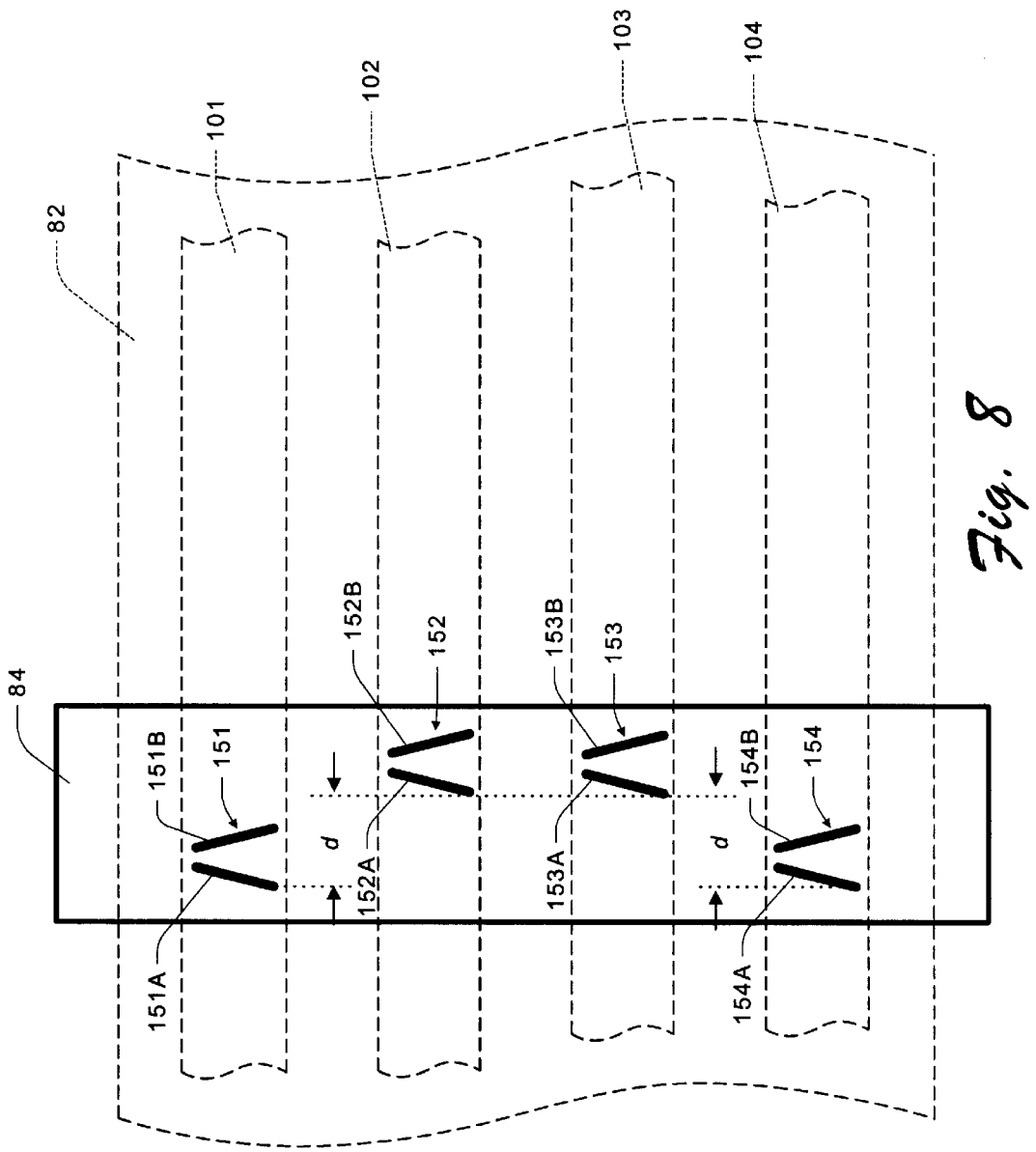
FIG. 8 illustrates the servo write elements of a servo write head in accordance with the invention, relative to an underlying segment of a linear tape that is to be formatted in accordance with the invention.

FIG. 8 shows a servo write head 84 that is used to establish servo bands on tape 82 before the tape is used for data storage. Servo write head 84 has a pattern of servo write elements or gaps that are activated with a single write pulse to simultaneously produce a plurality of magnetic transition stripes laterally across a linear data storage tape. The write element pattern is illustrated relative to linear tape 82 that includes servo bands 101, 102, 103, and 104. The pattern of write gaps includes at least one pair of magnetic transition stripes for each of a plurality of servo bands on the linear data storage tape. The two magnetic transition stripes of any given pair have different azimuthal slopes. More specifically, the write head pattern includes pairs of write gaps 151, 152, 153, and 154 at different lateral positions on the write head, corresponding to servo bands 101, 102, 103, and 104. One gap of each pair (labeled with an "A" suffix) is configured to produce a magnetic transition stripe having a positive slope. Another gap of each pair (labeled with a "B" suffix) is configured to produce a magnetic transition stripe having a negative slope. The various write elements or gaps are pulsed repeatedly to produce the servo band pattern shown in FIG. 6. The pairs are offset from each other in the longitudinal direction of the linear data storage tape. The offsets are calculated so that the offset between any two adjacent pairs of write elements is different from the offset between any other two adjacent pairs of write elements.

When writing any given pattern using write head 84, this configuration produces identical patterns on each servo band, except that the bands written by gaps 152 and 153 trail the bands written by gaps 151 and 154 (assuming right-to-left tape movement), by a distance equal to d, which is half of a frame length.

Although the invention has been described primarily in terms of its physical features, the invention also includes methodological steps. For example, the invention includes a method of establishing positioning information on a linear data storage tape. Such a method comprises writing a plurality of servo bands longitudinally along the linear data storage tape, wherein the servo bands have similar longitudinal patterns of magnetic transitions or stripes. The method also includes spacing the servo bands laterally across the linear data storage tape. The method further includes a step of longitudinally offsetting the magnetic transition patterns of the servo bands relative to each other to differentiate the servo bands from each other when subsequently reading and writing data in lateral positions relative to the servo bands.

The invention also includes a method of determining the lateral position of a tape head relative to a linear data storage tape. Such a method includes a step of detecting patterns of magnetic transition stripes along adjacent servo bands of the linear data storage tape with the tape head. A further step in accordance with the invention comprises comparing time intervals between alternate transition bursts on the storage tape, to determine tape head position relative to the servo bands. The method further includes a step of comparing longitudinal relationships of the patterns of magnetic transition stripes to differentiate said adjacent servo bands from other servo bands on the linear data storage tape.

Although the invention has been described and illustrated in the context of a system that utilizes four servo bands, the invention can also be adapted to systems using more or less servo bands. To use more servo bands, different offsets d are used between different adjacent pairs of servo bands, where the smallest offset is less that half of a frame length (such as ⅓ or ¼ of a frame length), and other offsets are integer multiples of the smallest offset. When reading or writing the tape, the magnitude and direction of servo pattern timing shift are detected to determine which servo bands are currently beneath the servo read heads of the tape head.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A servo write head comprising:
   a pattern of write gaps that are activated simultaneously to produce a plurality of magnetic transition stripes laterally across a linear data storage tape;
   the pattern of write gaps including at least one pair of magnetic transition stripes for each of a plurality of servo bands on the linear data storage tape, wherein the two magnetic transition stripes of any given pair have different azimuthal slopes;
   the pairs being offset from each other in the longitudinal direction of the linear data storage tape to produce offset patterns of magnetic transition stripes along the linear data storage tape.

2. A servo write head as recited in claim 1, wherein different adjacent pairs of servo bands have different relative offsets.

3. A method of determining position of a tape head relative to a linear data storage tape, comprising:
   detecting patterns of magnetic transition stripes along adjacent servo bands of the linear data storage tape with the tape head;
   comparing longitudinal relationships of the patterns of magnetic transition stripes to differentiate said adjacent servo bands from other servo bands on the linear data storage tape.

4. A method as recited in claim 3, wherein each servo band on the linear data storage tape has a similar pattern of magnetic transition stripes, said similar pattern comprising alternate bursts of magnetic transitions at different azimuthal slopes, the method further comprising comparing time intervals between the alternate bursts to determine tape head position relative to the servo bands.

5. A method as recited in claim 3, wherein each servo band on the linear data storage tape has a similar pattern of magnetic transition stripes, said similar pattern comprising alternate bursts of magnetic transitions at different azimuthal slopes, further comparing longitudinal relationships of the alternate bursts along the linear data storage tape to differentiate said adjacent servo bands from other servo bands on the linear data storage tape.

6. A method as recited in claim 3, further comparing patterns of an adjacent pair of servo bands to differentiate the adjacent pair of servo bands from other pairs of servo bands.

7. A method of establishing positioning information on a linear data storage tape, comprising:
- writing a plurality of servo bands longitudinally along the linear data storage tape, wherein the servo bands have patterns of magnetic transitions forming continuously repeating frames of servo data;
- spacing the servo bands laterally across the linear data storage tape;
- longitudinally offsetting the magnetic transition patterns of at least one of the servo bands relative to another of the servo bands by less than a length of a frame of servo data to differentiate the servo band relative to said another of the servo bands when subsequently reading and writing data in lateral positions relative to the servo bands.

8. A method as recited in claim 7, wherein the frames of servo data comprise alternate bursts of magnetic transitions at different azimuthal slopes.

9. A method as recited in claim 7, wherein the frames of servo data comprise:
- a first sub-frame having alternate bursts of magnetic transitions at different azimuthal slopes;
- a second sub-frame having alternate bursts of magnetic transitions at different azimuthal slopes, wherein the second sub-frame alternate bursts of magnetic transitions have fewer stripes than the first sub-frame alternate bursts of magnetic transitions.

10. A method as recited in claim 7, wherein the offsetting uses different relative offsets for different adjacent pairs of servo bands.

11. A linear data storage tape manufactured in accordance with the method recited in claim 7.

12. A linear data storage tape comprising:
- a plurality of servo bands positioned longitudinally along the linear data storage tape and spaced laterally across the linear data storage tape, wherein the servo bands have patterns of magnetic transitions forming continuously repeating frames of servo data;
- wherein the magnetic transition pattern of at least one of the servo bands is offset longitudinally relative to the magnetic transition pattern of another servo band to differentiate the servo bands from each other when reading and writing data in lateral positions relative to the servo bands, wherein the offset is less than a length of a frame of servo data.

13. A linear data storage tape as recited in claim 12, wherein the frames of servo data comprise alternate bursts of magnetic transitions at different azimuthal slopes.

14. A linear data storage tape as recited in claim 12, wherein the frames of servo data comprise:
- a first sub-frame having alternate bursts of magnetic transitions at different azimuthal slopes;
- a second sub-frame having alternate bursts of magnetic transitions at different azimuthal slopes, wherein the second sub-frame alternate bursts of magnetic transitions have fewer stripes than the first sub-frame alternate bursts of magnetic transitions.

15. A linear data storage tape as recited in claim 12, wherein different adjacent pairs of servo bands have different relative offsets.

* * * * *